United States Patent
Weiland

[11] 3,848,855
[45] Nov. 19, 1974

[54] TUBING CONNECTION

[76] Inventor: Edward E. Weiland, 8768 Buffalo, Union Lake, Mich. 48085

[22] Filed: June 18, 1973

[21] Appl. No.: 371,308

Related U.S. Application Data

[63] Continuation-in-part of Ser. No. 248,253, April 27, 1972, Pat. No. 3,776,523, which is a continuation-in-part of Ser. No. 120,107, March 2, 1971, abandoned.

[52] U.S. Cl............ 256/73, 256/59, 403/242, 403/263
[51] Int. Cl............................................. E04h 17/14
[58] Field of Search ....... 256/21, 22, 24, 59, 65–70; 403/230, 263, 227, 248, 249, 281; 285/222, 188, 189, 194, 382.4, 382.5; 29/522, 516

[56] References Cited
UNITED STATES PATENTS

| | | | |
|---|---|---|---|
| 643,591 | 2/1900 | Caswell | 403/242 |
| 975,082 | 11/1910 | Sheehy | 403/242 |
| 1,382,049 | 6/1921 | Aspinwall | 29/522 |
| 2,835,513 | 5/1958 | Pearson | 285/222 |
| 2,846,241 | 8/1958 | McDonnell et al. | 403/230 X |
| 3,073,627 | 1/1963 | Ritter | 403/277 X |
| 3,180,663 | 4/1965 | Lehamnn | 403/263 |
| 3,348,699 | 10/1967 | Mealing | 403/242 X |

FOREIGN PATENTS OR APPLICATIONS

| | | | |
|---|---|---|---|
| 765,902 | 3/1934 | France | 403/277 |
| 1,405,695 | 5/1965 | France | 403/263 |

Primary Examiner—Dennis L. Taylor
Attorney, Agent, or Firm—Joseph D. Odenweller

[57] ABSTRACT

Disclosed herein is a tubing connection comprising a longitudinal slot in a second tube member with a pair of inwardly bent flanges along the longitudinal edges of the slot and a first tube member having an end flattened to form two spaced flattened surfaces. The flattened surfaces are separated by recesses cut in the end of the first tube between the flattened surfaces forming two tabs which extend inside the second tube member through the longitudinal slot. The flanges and tabs are spread to conform to the inside contour of the second tube member and a reinforcing member is then pressed inside the spread tabs.

6 Claims, 7 Drawing Figures

PATENTED NOV 19 1974　　3,848,855

TUBING CONNECTION

PRIOR APPLICATIONS

This application is a Continuation-in-Part of application Ser. No. 248,253, filed Apr. 27, 1972, now U.S. Pat. No. 3,776,523 which in turn is a Continuation-in-Part of application Ser. No. 120,107, filed Mar. 2, 1971 now abandoned.

BACKGROUND

Tubing assemblies are constructed for many purposes, such as fences, gates, antenna towers, pre-fab kennels, scaffolding, swing supports, and the like. One of the major use areas relates to the construction of fences and related fixtures. Essentially tubing assemblies, for whatever purpose they might be used, have in common the fact that they comprise a plurality of tubular members which are connected to form the desired structure. Such connections must be strong and substantially rigid in order to impart structural integrity to the completed unit. In the past, the most accepted method of making such connections was to butt one member against another and weld them together. This is time consuming and does not adapt well to rapid production. It also required that the work be performed at the factory where the necessary welding equipment is located, which greatly limited the amount of assembly that could be done at the construction site.

In my prior applications Ser. Nos. 248,253 and 120,107, I described a tubing connection formed by cutting an elongated slot in a second tube member, flattening the end of a first tube member and cutting recesses between the spaced flattened surfaces to form two tabs, inserting the tabs through the elongated slot and spreading the tabs to conform with the inside contour of the second tube member. A reinforcing member could be pressed between the spread tabs to improve the rigidity of the connection. The present invention is an improvement in my previous invention which provides a very rigid connection especially resistant to rotational distortion.

SUMMARY OF THE INVENTION

According to the present invention a tubing connection is provided which comprises a second tube member having a longitudinal slit recessed at each end forming a pair of flanges which are bent inwardly to open a longitudinal slot. A first tube member is partially flattened at its end to form opposed spaced flat surfaces. A recess is cut between the flattened section to form two tabs extending from the end of the first tube member. These tabs are inserted through the slot in the second tube member between the flanges and then the tabs and flanges are spread to substantially conform with the inside contour of the first tube member. To improve strength generally, a cylindrical reinforcing member is pressed between the spread tabs.

DESCRIPTION OF A PREFERRED EMBODIMENT

Figure 1:
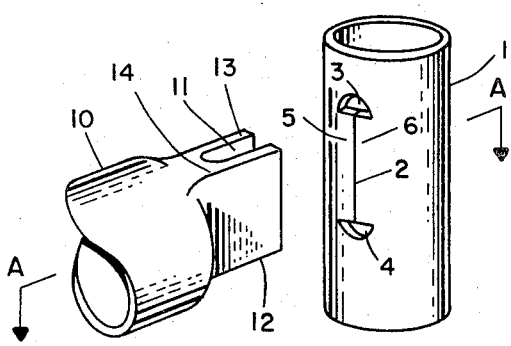
FIG. 1 is a perspective view of first and second tube members prior to making the connection.
Figure 3:
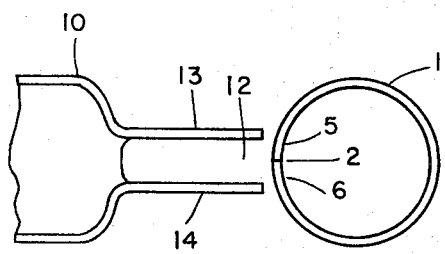
FIG. 3 is a cross-section taken at AA of FIG. 1.

FIGS. 1 and 3 show two tube members of a tubular assembly which have been prepared to make a rigid connection of this invention. Second tube member 1 has a longitudinal slit 2 cut in its side wall. At each end of slit 2 are recesses 3 and 4 which form flanges 5 and 6.

First tube member 10 has its end section flattened. Recesses 11 and 12 are cut between the spaced flattened surfaces to form tabs 13 and 14.

Figure 4:
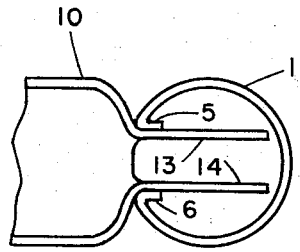
FIG. 4 is a similar cross-section of the partially completed connection.
Figure 5:
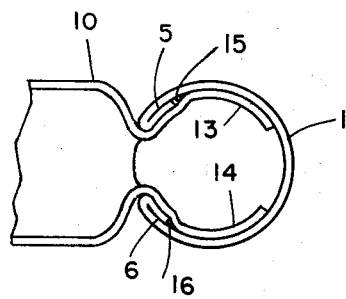
FIG. 5 is a similar cross-section of the completed connection prior to inserting the reinforcing insert.
Figure 6:
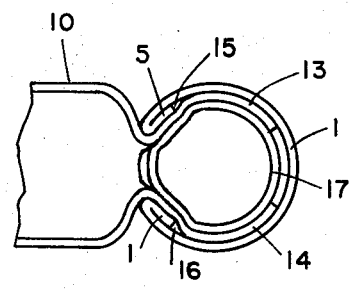
FIG. 6 is a similar cross-section with the reinforcing insert pressed into place.

FIG. 4 shows the next stage of making the connection. Flanges 5 and 6 are bent inwardly and tabs 13 and 14 inserted into tube 1 between flanges 5 and 6. The next stage is shown in FIG. 5 where flanges 5 and 6 are pressed back to conform with the inside contour of tube 1 and tabs 13 and 14 are spread to substantially conform with the inside contour of flanges 5 and 6 and tube 1. This is readily accomplished by driving a pointed cylindrical tool in between tabs 13 and 14. The tool diameter should be somewhat less than the inside diameter of tube 1 to allow for the metal thickness of tabs 13 and 14. Also, modification of the tool can be made to allow for the thickness of flanges 5 and 6 so that an arc of the tool between shoulders 15 and 16 has a slightly smaller diameter than the rest of the tool. The tool is then withdrawn.

An important feature of the connection is the manner by which tabs 13 and 14 lock against the shoulders 15 and 16 formed by the edge of flanges 5 and 6. Tabs 13 and 14 conform to the inside diameter of flanges 5 and 6 and then curve over shoulders 15 and 16 and expand to the inside diameter of tube 1. This prevents any rotational distortion of tube 1 and results in an exceptionally rigid connection.

Figure 2:
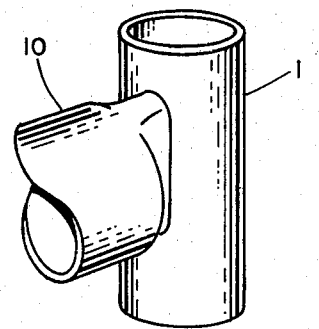
FIG. 2 is a perspective view of the completed connection.

The connection is completed by pressing reinforcing insert 17 in between spread tabs 13 and 14 to hold them securely against flanges 5 and 6, shoulders 15 and 16, and the inside surface of tube 1. The reinforcing insert may be solid or hollow and may be made of any material such as aluminum, wood, plastics such as polyethylene, polypropylene, acrylonitrile-butadienestyrene terpolymer, polyformal, polycarbonate, polyamides, and the like. The reinforcing insert may be an extension of a decorative cap which closes the end of tube 1. In the preferred embodiment shown the reinforcing insert is a short tubular member which when pressed inside spread tabs 13 and 14 distorts slightly to conform with the different diameters. The completed connection is shown in perspective in FIG. 2.

Figure 7:
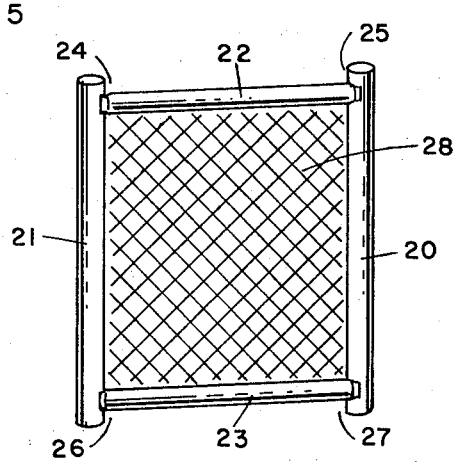
FIG. 7 is a perspective of a rectangular gate frame.

An especially useful application of the invention is in the manufacture of rectangular tubular frames which may be used as gates or pre-fab fence sections such as used to construct kennels. Such a frame is shown in FIG. 7. It comprises two upright tube members 20 and 21 and two horizontal tube members 22 and 23 which are connected at their ends by connections 24, 25, 26 and 27 of the type described above. Fencing 28 is then connected within the frame.

It will be apparent that modification may be made in the sequence in which the steps leading to the connection are carried out which will still lead to substantially equivalent results and are considered to be within the scope of the following claims.

I claim:

1. A tubing assembly comprising a connection of a first tube member to a second tube member, said second tube member having an elongated longitudinal slot in its side wall, a pair of flanges along the longitudinal edges of said slot, said flanges being deformed away from each other inside said second tube member and conforming to the inside surface of said second tube member, said first tube member having opposed recesses in an end forming two tabs extending from said end, said tabs being flattened and extending through said slot and being spread outwardly within said second tube member to substantially conform with the inside surface of said flanges and said second tube member thereby securely connecting said first tube member to said second tube member.

2. A tubing assembly of claim 1 having a reinforcing insert tightly fit inside said spread tabs.

3. A tubing assembly of claim 2 wherein said reinforcing insert is a tubular insert.

4. A tubing assembly of claim 1 comprising four tubular members connected at their ends by said connection to form a substantially rectangular frame.

5. A tubing assembly of claim 4 having tubular reinforcing inserts tightly fit inside said spread tabs of each of said connections.

6. A tubing assembly of claim 5 having fencing within said rectangular frame connected to said four tubular members.

* * * * *